(12) United States Patent
Gong et al.

(10) Patent No.: US 12,394,205 B1
(45) Date of Patent: Aug. 19, 2025

(54) SYSTEM AND METHOD FOR FOOD SERVICE CONSUMPTION TRACKING

(71) Applicant: Foodfx Inc, San Jose, CA (US)

(72) Inventors: Fengmin Gong, Los Altos Hills, CA (US); Jun Du, Cupertino, CA (US); Samir Virmani, San Jose, CA (US)

(73) Assignee: Foodfx Inc, San Jose, CA (US)

(*) Notice: Subject to any disclaimer, the term of this patent is extended or adjusted under 35 U.S.C. 154(b) by 377 days.

(21) Appl. No.: 18/092,768

(22) Filed: Jan. 3, 2023

(51) Int. Cl.
| G06K 9/00 | (2022.01) |
| G06T 7/11 | (2017.01) |
| G06T 7/50 | (2017.01) |
| G06V 20/52 | (2022.01) |
| G06V 20/68 | (2022.01) |

(52) U.S. Cl.
CPC ............. *G06V 20/52* (2022.01); *G06T 7/11* (2017.01); *G06T 7/50* (2017.01); *G06V 20/68* (2022.01); *G06T 2207/10024* (2013.01); *G06T 2207/10028* (2013.01)

(58) Field of Classification Search
CPC .......... G06V 20/52; G06V 20/68; G06T 7/11; G06T 7/50; G06T 2207/10024; G06T 2207/10028
See application file for complete search history.

(56) References Cited

U.S. PATENT DOCUMENTS

| 8,345,930 | B2* | 1/2013 | Tamrakar | G06T 7/593 |
| | | | | 382/110 |
| 2015/0228062 | A1* | 8/2015 | Joshi | G06V 10/58 |
| | | | | 382/110 |

| 2017/0069225 | A1* | 3/2017 | Ortiz | H04N 7/183 |
| 2022/0270238 | A1* | 8/2022 | Mc Donnell | G06V 20/52 |
| 2022/0319665 | A1* | 10/2022 | Wang | G16H 40/63 |
| 2023/0196802 | A1* | 6/2023 | Gong | G06V 20/68 |
| | | | | 382/110 |

(Continued)

FOREIGN PATENT DOCUMENTS

| EP | 1179799 A2 * | 2/2002 | ........... G06F 19/324 |
| WO | WO-2020099498 A1 * | 5/2020 | ............... G06N 3/02 |

OTHER PUBLICATIONS

A review on vision-based analysis for automatic dietary assessment, Wei Wang et al., Elsevier, 2022, pp. 223-237 (Year: 2022).*

(Continued)

*Primary Examiner* — Jayesh A Patel
(74) *Attorney, Agent, or Firm* — Sheppard Mullin Richter & Hampton LLP

(57) ABSTRACT

Methods, systems, and apparatuses, including computer programs encoded on computer storage media, for tracking consumption rate of food in food containers. An example method includes capturing an image of a food station using an RGB camera, determining bounding boxes on the image that correspond to food containers in the food station, capturing an overall point cloud of the food station using a depth camera, cropping a point cloud for each food container from the overall point cloud based on the bounding boxes. Then for each food container, a volume of remaining food in the food container is determined based on the point cloud of the food container, and the food consumption information of the food containers is obtained by tracking volume changes of the remaining food in food containers.

20 Claims, 10 Drawing Sheets

(56) References Cited

U.S. PATENT DOCUMENTS

2023/0214982 A1* 7/2023 Michel ............... G06V 10/255 382/110

OTHER PUBLICATIONS

Point Cloud Processing Method for Food Volume Estimation Based on Dish Space, Takuo Suzuki et al., IEEE, 2020, pp. 5665-5668 (Year: 2020).*

Recognition and Volume Estimation of Food Intake using a Mobile Device, Manika Puri et al., IEEE, 2009, pp. 1-8 (Year: 2009).*

A New Approach to Image-Based Estimation of Food Volume, Hamid Hassannejad et al., MDPI, 2017, pp. 1-14 (Year: 2017).*

A Comprehensive Survey of Image-Based Food Recognition and Volume Estimation Methods for Dietary Assessment, Ghalib Ahmed Tahir et al., MDPI, 2021, pp. 1-37 (Year: 2021).*

Food Volume Estimation Based on Deep Learning View Synthesis from a Single Depth Map, Frank P.-W. Lo et al., MDPI, 2018, pp. 1-20 (Year: 2018).*

Real-time instance segmentation and point cloud extraction for Japanese food using RGB-D camera , Suthiwat Yarnchalothorn et al., Thesis, 2020, pp. 1-61 (Year: 2020).*

Image-Based Estimation of Real Food Size for Accurate Food Calorie Estimation, Takumi Ege et al., IEEE, 2019, pp. 274 (Year: 2019).*

Automatic food intake tracking requires depth-refned semantic segmentation to rectify visual-volume discordance in long-term care homes, Kaylen J. Pfsterer et al., Scientific reports, 2022, pp. 1-16 (Year: 2022).*

F oRConvD: An approach for food recognition on mobile devices using convolutional neural networks and depth maps, Vlad-Ioan Tomescu, IEEE, 2020, pp. 000129-000134 (Year: 2020).*

Deep-Learning-Assisted Multi-Dish Food Recognition Application for Dietary Intake Reporting, Ying-Chieh Liu et al., MDPI, 2022, pp. 1-17 (Year: 2022).*

DepthGrillCam: A Mobile Application for Real-time Eating Action Recording Using RGB-D Images, Kento Adachi et al., ACM, 2022, pp. 55-59 (Year: 2022).*

Image-Based Food Classification and Volume Estimation for Dietary Assessment: A Review, Frank Po Wen Lo, IEEE, 2020, pp. 1926-1939 (Year: 2020).*

* cited by examiner

130 Premade food station

120 Batch cooking station

110 Expedited food station

SYSTEM AND METHOD FOR FOOD SERVICE CONSUMPTION TRACKING

TECHNICAL FIELD

The disclosure generally relates to systems and methods for food consumption tracking in food servicing, specifically, an Artificial Intelligence (AI) assisted multi-sensor device and system for tracking food consumption.

BACKGROUND

Food waste is a massive problem across our society. It's most apparent across the self-serve food industry. Traditional self-serve food services, such as cafeteria, buffet, banquet, or food market, lack the capability of automatic consumption tracking. Without an accurate measuring of the consumption rates of the dishes and ingredients, the product planning can only be based on estimation or empirical data points, which may naturally lead to under-preparation or over-preparation.

To enable food service providers to track the food consumption, some existing solutions use weight sensors to measure the weight changes of the food containers. However, weight sensor-based solutions are only available for limited scenarios. For other use cases, such as stations where the food containers (e.g., pans) are placed on hot stoves or on a layer of ice cubes, there is no space to install the weight sensors. In this disclosure, an AI-assisted vision-based system is described to provide a more universal solution that helps the food service providers to track food consumption rates, make more informed product planning, and reduce food waste.

SUMMARY

Various embodiments of the present specification may include systems, methods, and non-transitory computer-readable media for tracking food consumptions with an AI-assisted vision system.

In some aspects, the techniques described herein relate to a system for tracking food consumption, including: an RGB camera monitoring a food station, wherein the food station includes a plurality of food containers; a depth camera monitoring the food station; and a processor and one or more memories, wherein the one or more memories store instructions executable by the processor to cause the processor to perform operations including: receiving an image of the food station captured by the RGB camera; determining a plurality of bounding boxes for the plurality of food containers based on the image; receiving an overall point cloud of the food station from the depth camera; cropping a point cloud for each of the plurality of food containers from the overall point cloud based on the plurality of bounding boxes; for each of the plurality of food containers, determining a volume of remaining food in the food container based on the point cloud of the food container; and obtaining food consumption information for the plurality of food containers by tracking volume changes of the remaining food in the plurality of food containers.

In some aspects, the obtaining food consumption information of the plurality of food containers includes: cropping, for each of the plurality of food containers, a food image from the image captured by the RGB camera based on the plurality of bounding boxes; feeding the cropped food image into a food recognition machine learning model trained to identify a food in the cropped food image; obtaining food information of the food in the cropped food image; and obtaining the food consumption information based on the food information and the tracked volume change of the remaining food in the plurality of food containers.

In some aspects, the operations further include: training the food recognition machine learning model based on training images of dishes served on the food station, wherein the training images are associated with ground truth labels, and the training includes a plurality of iterations, each iteration including: inputting the labeled images of the dishes into a neural network, wherein the neural network includes a plurality of parameterized layers; obtaining predicted labels of the dishes from the neural network; determining errors between predicted labels and the ground truth labels; and adjusting parameters of the neural network to minimize the errors.

In some aspects, the determining the volume of the remaining food in the food container includes: receiving a baseline point cloud of the food container when the food container is empty; computing differences between the baseline point cloud and the point cloud; and determining the volume of the remaining food based on the differences.

In some aspects, the system further includes: a second depth camera monitoring the food station, wherein the depth camera and the second depth camera monitor the food station from different angles.

In some aspects, the operations further include: performing point cloud compensation before determining the volume of the remaining food in the food container, wherein the point cloud compensation includes: determining a portion of the point cloud for the food container is missing due to vision blockage; extracting a compensatory point cloud from a point cloud captured by the second depth camera; and aggregating the compensatory point cloud and the point cloud to determine the volume of the remaining food in the food container.

In some aspects, the operations further include: receiving real-time images from the RGB camera; determining motions on each of the plurality of bounding boxes based on the real-time images; and in response to no motion being detected on one bounding box, receiving the overall point cloud from the depth camera.

In some aspects, the obtaining the food consumption information for the plurality of food containers includes: for each of the plurality of food containers, identifying food in the food container by inputting pixels of the image in the corresponding bounding box into a trained neural network to obtain food information; retrieving ingredient information of one or more ingredients of the food in the plurality of food containers based on the food information; and for each of the one or more ingredients, computing a consumption rate of the ingredient based on the ingredient information and the tracked volume changes of the remaining food in the plurality of food containers.

In some aspects, the depth camera is a stereo camera, a Sonar camera, or a LiDAR.

In some aspects, the operations further include performing angle compensation before determining the volume of the remaining food in the food container, wherein the angle compensation includes: for each of the plurality of food containers, determining a viewing angle for the food container from the depth camera; and determining the volume of the remaining food in the food container by compensating the view angle of the food container.

In some aspects, the techniques described herein relate to a computer-implemented method, including: receiving an image of a food station captured by an RGB camera monitoring the food station, wherein the food station includes a plurality of food containers; determining a plurality of bounding boxes for the plurality of food containers based on the image; receiving an overall point cloud of the food station captured by a depth camera monitoring the food station; cropping a point cloud for each of the plurality of food containers from the overall point cloud based on the plurality of bounding boxes; for each of the plurality of food containers, determining a volume of remaining food in the food container based on the point cloud of the food container; and obtaining food consumption information for the plurality of food containers by tracking volume changes of the remaining food in the plurality of food containers.

In some aspects, the techniques described herein relate to a non-transitory computer-readable storage medium, configured with instructions executable by one or more processors to cause the one or more processors to perform operations including: receiving an image of a food station captured by an RGB camera monitoring the food station, wherein the food station includes a plurality of food containers; determining a plurality of bounding boxes for the plurality of food containers based on the image; receiving an overall point cloud of the food station captured by a depth camera monitoring the food station; cropping a point cloud for each of the plurality of food containers from the overall point cloud based on the plurality of bounding boxes; for each of the plurality of food containers, determining a volume of remaining food in the food container based on the point cloud of the food container; and obtaining food consumption information for the plurality of food containers by tracking volume changes of the remaining food in the plurality of food containers.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

The description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Figure 1:
FIG. 1 illustrates exemplary scenarios in which an AI-assisted vision system for food consumption tracking may be implemented, in accordance with some embodiments.
Figure 1:
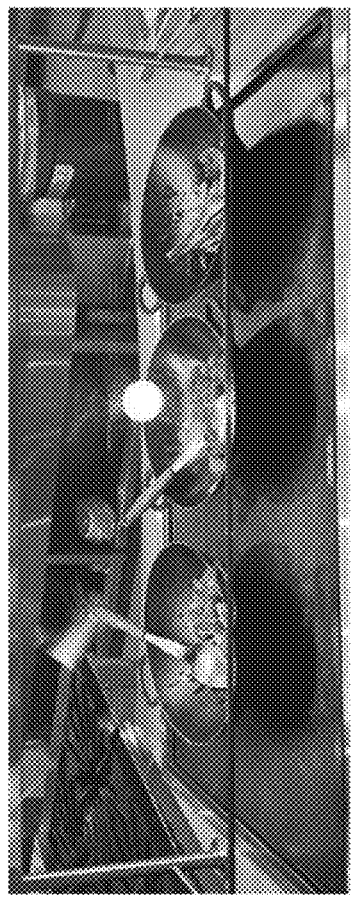
Figure 1:
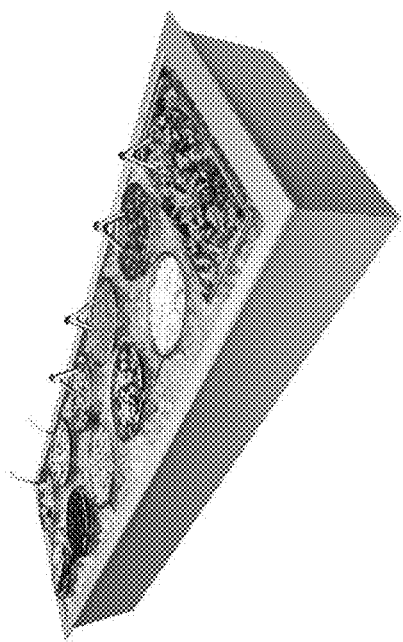

As briefly mentioned in the background section, the existing weight sensor-based food consumption tracking systems have their limitations. FIG. 1 illustrates exemplary scenarios in which a weight sensor-based tracking system is either impractical to install or is unable to accurately track the food consumption. Using expedited food stations 110 (such as a salad bar or a fruit station) as examples, the food containers may be placed on ice or cold water to keep the food cold and fresh. This setup makes the installation of weight sensors for each container impractical. Using a batch cooking station 120 as another example, the food containers (e.g., wok pan as shown in FIG. 1) are placed on hot stoves or burners. In this scenario, a weight sensor-based food consumption tracking system would require load cells with high-temperature tolerance, which leads to a higher cost. For the pre-made food station 130 (e.g., grab-and-go food stations) scenarios, pre-packaged food boxes are piled together on a large tray for users to pick up. In this scenario, installing weight sensors on the tray may be able to measure the weight changes when a box is picked up from the tray. However, it requires extensive tuning for the system to recognize the location of the box that is taken, which is critical for accurate measurement.

In addition to the real-world use cases illustrated in FIG. 1, there are many other scenarios in which a weight sensor-based food consumption tracking system is impractical. The primary cause of this impracticality is that the weight sensors or load cells are hard to install in those setups. In comparison, a vision-based food consumption tracking system is more universally applicable. The following description introduces an AI-assisted vision system for food consumption tracking. This system relies on vision data captured by a depth camera and an RGB camera to track food consumption with the assistance of trained machine learning models. The depth camera automatically detects the presence of any object within its field of view and measures the distance to it on the go. The RGB camera may be used to deliver colored images of people and objects by capturing light in red, green, and blue wavelengths (RGB). It utilizes visible light with a wavelength ranging from 400 to 700 nm.

Figure 2:
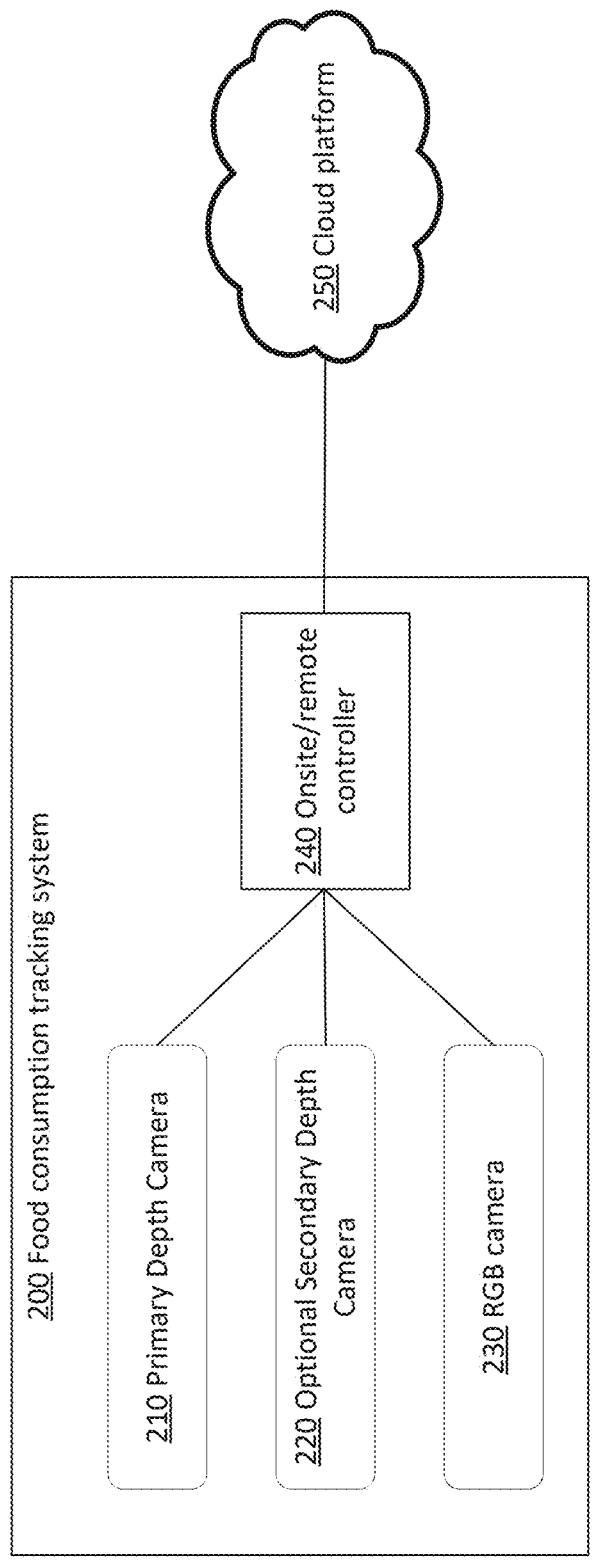
FIG. 2 illustrates a diagram of an exemplary AI-assisted vision system for food consumption tracking in accordance with some embodiments.

FIG. 2 illustrates a diagram of an exemplary AI-assisted vision system 200 for food consumption tracking in accordance with some embodiments. The system 200 includes various hardware and software components. The components are for illustrative purposes only, and do not limit the architecture of the system 200.

As shown, the system 200 may include a plurality of hardware devices for data collection (210-230), and a controller 240 that aggregates the collected data and performs data analysis. The hardware devices include a primary depth camera 210, an optional secondary depth camera 220, and an RGB camera 230. The cameras may be installed on or near a food serving station to monitor the food containers (e.g., pans). For instance, the cameras may be installed on the body (e.g., in the middle of the top frame, or at the top of the side frames) of the food serving station and overlook the food containers. As another example, the cameras may be hanging from the ceiling, or installed with standalone camera stands next to the food serving station, to overlook the food containers.

The controller 240 may be an on-premise server (e.g., a computing device located on-site), a remote server, or a cloud-based server (e.g., as a part of the cloud platform) with data processing and storage capabilities. The controller 240 aggregates the data collected by the cameras, and applies the data into multiple machine learning models to extract information, such as food container layout, food identification, per-container volume tracking, etc. The machine learning models may be pre-trained from another entity and stored on the server for use, or may be trained and deployed by the server. The information extracted by the controller 240 may be stored in the cloud platform 250 for further analysis. The analysis results may be used for production planning (e.g., inventory management, real-time refill alerting). The controller 240 may receive data from the cameras through wired connections or wireless connections.

In some embodiments, the primary depth camera 210 may be a stereo vision sensor, a time of flight (ToF) camera, a Light Detection and Ranging (LiDAR) sensor, or a Sonar sensor. A stereo vision sensor includes two or more image sensors that allow the camera to simulate human binocular vision and therefore gives it the ability to perceive depth. A time-of-flight camera (ToF camera) is a range imaging camera system employing time-of-flight techniques to resolve distance between the camera and the subject for each point of the image, by measuring the round trip time of an artificial light signal provided by a laser or an LED. Both LiDAR and Sonar cameras transmit waves through pulses to detect objects. The returning pulses are then measured to determine speed and distance. The main difference between these two sensors is the type of signal reflected off the object: LiDAR uses light pulses, and Sonar uses sound waves. For simplicity, no matter which type of depth camera is used, "point cloud" is used in the following description to refer to the output of the depth camera. The point cloud includes a set of spatial data points (spatial information) of the monitored area. The spatial data points may be used to compute the volume of the objects/substance in the monitored area. Using a food pan as an example, assuming the baseline volume (e.g., an empty pan) is known, a later captured point cloud of the pan may be used to determine the volume of the remaining food in the pan.

In some embodiments, the optimal secondary depth camera 220 may be needed when the primary depth camera's field of view is blocked. For instance, if the food station is wide and the primary depth camera 210 is unable to capture the volume information of all food containers on the food station, the secondary depth camera 220 may be installed to provide compensatory point clouds.

In some embodiments, the RGB camera 230 may include an RGB camera that captures 2D images of the food station. The 2D images may be captured periodically or continuously. The RGB camera 230 and the depth cameras are time synchronized. The RGB image and the point cloud collected at the same time stamp will be used collectively for food consumption tracking purposes.

Figure 3A:
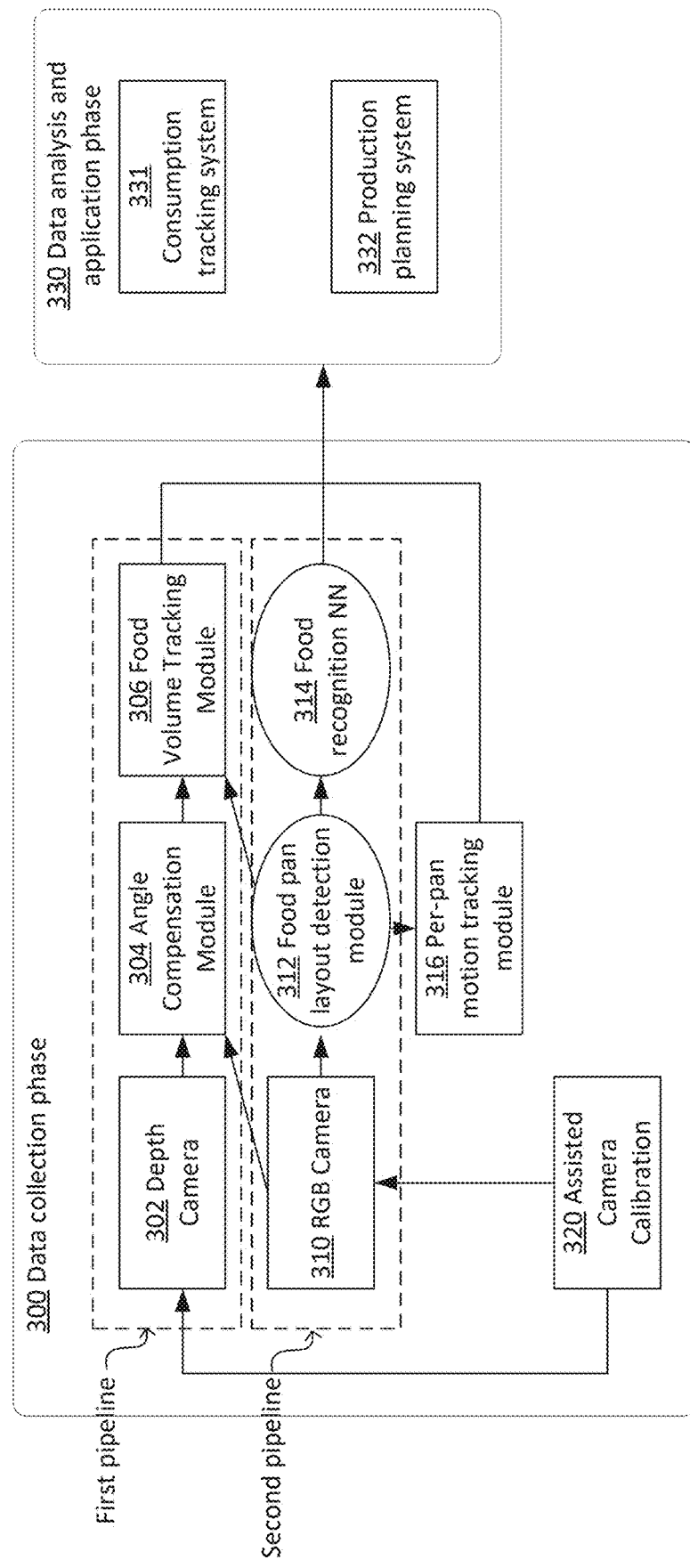
FIG. 3A illustrates an exemplary system diagram of an AI-assisted vision system in accordance with some embodiments.

FIG. 3A illustrates an exemplary system diagram of an AI-assisted vision system in accordance with some embodiments. From a high level, the system includes a data collection phase 300 and a data application phase 330. The data collection phase 300 may include two main pipelines: a first pipeline involves processing data collected by a depth camera 302, and a second pipeline involves processing data collected by an RGB camera 310. The data from the second pipeline may be fed into the first pipeline for angle compensation or to enable per-container (also called per-pan) food volume tracking.

In some embodiments, the first pipeline starts with triggering a depth camera 302 to monitor a food station and capture a point cloud of the food station. The food station may host a plurality of food containers (e.g., pans) serving various food. The point cloud of the food station includes spatial data points of the food container, including the food containers hosted in the food station and the food therein. The depth camera 302 may be configured to capture the point cloud periodically (e.g., a few seconds). In some embodiments, the depth camera 302 stops capturing the point cloud when there is active motion detected (e.g., a user is taking food from the pans). The motion may be detected based on images or videos captured by the RGB camera 310. For instance, the RGB camera 310 may continuously capture the images of the food station, and any observed foreign objects (e.g., objects appearing temporarily in the field of view) may be determined as a motion. This information may then be sent to the depth camera 302 to disable the point cloud capturing. This is because the depth camera 302 will not accurately capture the point cloud of the food containers when the foreign object/motion is blocking the view (e.g., a human arm taking food blocks the view of the depth camera 302). In other embodiments, the motion may be detected by a standalone motion sensor.

In some embodiments, an angle compensation module 304 may be optionally deployed in the first pipeline to compensate for the point cloud data with pre-configured angle information. For instance, a first point cloud of the food container right below the depth camera 302 and a second point cloud of another food container that is 60 degrees left of the depth camera 302 may be processed differently by considering their respective angles from the depth camera 302. The second point cloud (i.e., the spatial data points) may be adjusted based on the angle information to more accurately measure the volume of the food in the food container.

In some embodiments, a food volume tracking module 306 may receive (1) the point cloud data (or angle-compensated point cloud data) flowing through the first pipeline and (2) food container layout information to perform per-pan food volume tracking. For instance, the food container layout information may be received from the second pipeline, where the RGB camera 310 captures the image of the food station, and feeds the image into a pan layout recognition neural network to generate the bounding boxes of the food containers. The food volume tracking module 306 may then segment or crop the point cloud of the food station into a plurality of pan-specific point clouds based on the bounding boxes. In other words, the overall point cloud of the entire food station is divided (e.g., cropped) into a plurality of smaller point clouds that respectively correspond to the plurality of food containers (e.g., pans) on the food station. The pan-specific point clouds represent current volumes of the pans. In some embodiments, the baseline volumes of the pans may be pre-configured or pre-learned by the depth camera 302 using empty pans. With the current volume and the baseline volumes of the pans, the food volume tracking module 306 may determine the volumes of the remaining food in the pans.

In some embodiments, the second pipeline may start with triggering the RGB camera 310 to capture 2D images of the food station. The 2D images may be collected periodically or continuously. The 2D images may be used to extract various useful information. For instance, a food pan layout detection module 312 may use image processing mechanisms to perform object annotation on the captured 2D images. An exemplary embodiment of a pan layout recognition model is further described in FIG. 3C.

The generated bounding boxes for the pans may be sent to (1) the food volume tracking module 306 to generate per-pan point clouds in order to perform per-pan food volume tracking, and (2) a food recognition neural network 314 to recognize the food in each pan. The food recognition neural network 314 may be trained to recognize the food in each bounding box (i.e., each pan). In some embodiments, the food recognition neural network 314 may be trained based on labeled dish images.

During the inferencing phase, the food recognition neural network 314 may receive an image of the food in a food container, extract features (e.g., shape, color) from the image of the food, and generate an identification of the food based on the extracted features. For instance, sub-images may be cropped from the 2D image of the food station based on the generated bounding boxes. The pixels of a sub-image may be input into the food recognition neural network 314, which extracts the features (e.g., color, shape, pattern) from the pixels and generates a food identification based on the features. An exemplary embodiment of a dish/food recognition machine learning model is further described in FIG. 3C.

In some embodiments, the bounding boxes generated by the food pan layout detection module 312 may also be fed into a per-pan motion tracking module 316, which may detect the motion on specific pans. When a motion is detected on a pan, the food volume tracking module 306 may discard the point cloud corresponding to the pan. This is because the motion likely introduces noise data into the point cloud. This way, the food volume tracking module 306 can effectively remove the noise data and thereby conserve computing resources.

In some embodiments, an assisted camera calibration module 320 may be implemented to provide automatic camera angle calibration to the depth camera 302 and RGB camera 310. This module is configured to identify the optimal installing locations and/or the angles of the depth camera 302 and RGB camera 310. For example, the calibration module 320 may automatically generate multiple fields of view of the depth camera 302 and RGB camera 310 before they are installed, and display these fields of views to an operator for selection. The operator's selection may be used to determine the optimal locations and angles for the depth camera 302 and RGB camera 310. Once the calibration is done, the angle to the image is calculated and used to determine the exact location of the camera. This information is then used to do "warping" for both 2D and 3D images, to get a more accurate result of the image classification and depth measurements.

After each iteration of the data collection phase 300, the first and second pipelines may generate per-pan food volume data (from the food volume tracking module 306) and per-pan food identification results (from the food recognition NN 314). This data may be further fused and exploited in the data application phase 330, such as by a food consumption tracking system 331 and a production planning system 332. The food consumption tracking system 331 may be configured to monitor the consumption rates of the food in the food containers, and the production planning system 332 may be configured to determine food preparation, replenishment, and material ordering. More details of these two systems are described in FIGS. 3D-E.

Figure 3B:
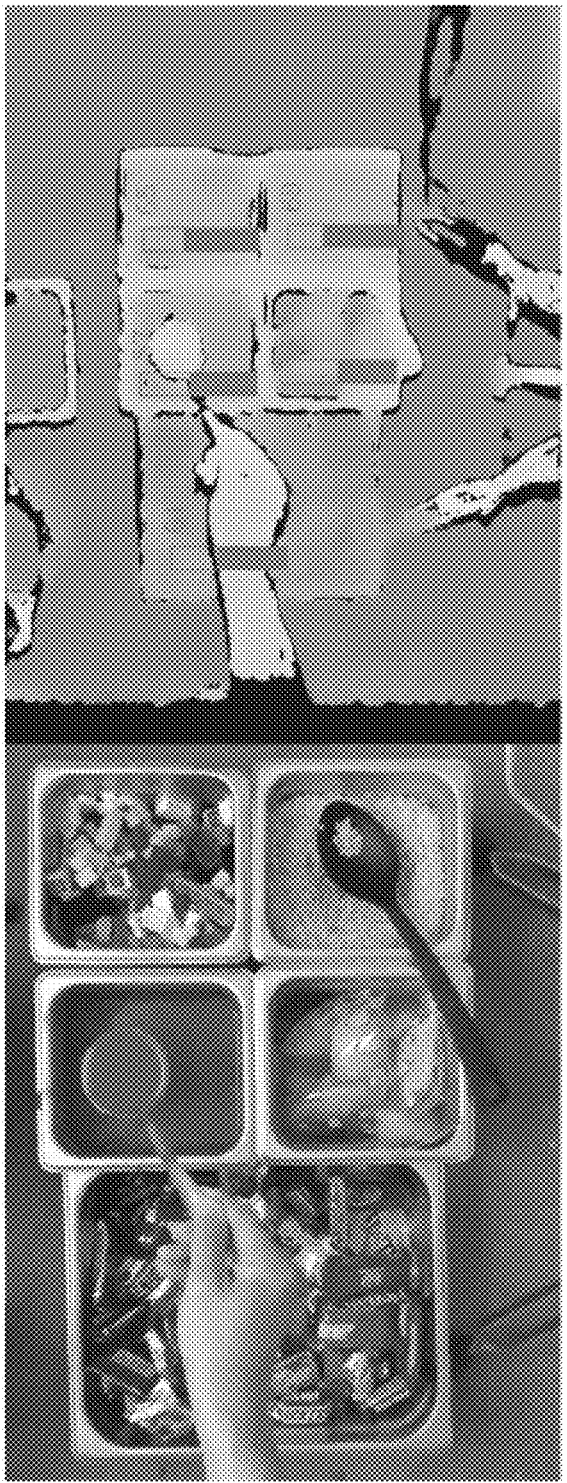
FIG. 3B illustrates an exemplary motion-aware volume tracking using an AI-assisted vision system in accordance with some embodiments.

FIG. 3B illustrates an exemplary motion-aware volume tracking using an AI-assisted vision system in accordance with some embodiments. As described in FIG. 3A, a depth camera and an RGB camera are configured to monitor a food station. The food station may include a plurality of pans or other types of food containers that contain various food, such as packaged items (e.g., candies, snacks), liquid (e.g., soup), etc.

The RGB camera captures images 380 of the food station. The images 380 may include a video or a series of images, which include the pans on the food station and the motion of a user hand/arm if any. The images 380 may then be fed into a first machine learning model to generate bounding boxes for the pans.

The depth camera captures the point cloud of the food station. In some embodiments, the captured point cloud may be segmented into pan-specific regions based on the bounding boxes generated based on the 2D images 380. The point cloud data points for other regions outside of the pan regions may be discarded. In some embodiments, to further reduce the volume of data to be processed, the depth camera may receive the bounding boxes, and capture the point cloud data points for the regions within the bounding boxes.

Subsequently, per-pan volume tracking 382 may be performed based on the per-pan point cloud. For instance, assuming the point clouds of empty pans are known, the real-time point clouds of the pans may be used to determine the current food volumes in the pans based on the point clouds of empty pans. In some embodiments, the per-pan volume tracking 382 may display bars or pie charts showing the percentages of the remaining foods in the pans. In some embodiments, charts may be built based on the real time data to show the volume is trending down over a period of time, to ensure the result is accurate over a period of time, when the "pan empty alert" is triggered, when the remaining volume is below a certain threshold.

Note that the motion detected based on the 2D images 380 may affect the per-pan volume tracking 382. For instance, when the user hand blocks a pan, the volume tracking of that particular pan may be interrupted. As another example, when a user takes liquid out of the pan, the remaining liquid may show fluctuation. These motions may cause temporary inaccuracy of the volume tracking. To address this issue and make the tracking trajectory more continuous, the per-pan volume tracking may pause when there is motion detected based on the images collected by the 2D camera or the point clouds collected by the depth camera. In other embodiments, the depth camera may be disabled when a motion is detected, and re-enabled when no motion is detected (e.g., the number of changing pixels across the 2D images captured during a period of time is below a threshold).

In some embodiments, there is a margin of error in depth measurement, which could be as big as 1% of the distance from the camera to the surface of the food. To address this issue, the 2D images 380 may be used to validate or even override the volume tracking 382 in certain scenarios.

For instance, when a point cloud of a food container indicates that the volume of the remaining food is zero (e.g., empty pan), the 2D image of the food container (e.g., cropped from the 2D image of the entire food station based on a bounding box corresponding to the food container) may be used to verify if the food container is indeed empty. The 2D image of the food container may be used to generate a validating volume. When a discrepancy between the validating volume and the volume determined based on the point cloud is greater than a threshold (e.g., the point cloud indicates the food container is empty, but the 2D image shows there are a few items or a few amounts of food left in the pan), the volume determined based on the 2D image may take priority and be adopted as the tracking results and displayed to the users. The 2D image validation may also be triggered when the food container is determined (based on the 2D image) as full or above full level (e.g., itemized/packaged items may be above the full-level of the food container).

Figure 3C:
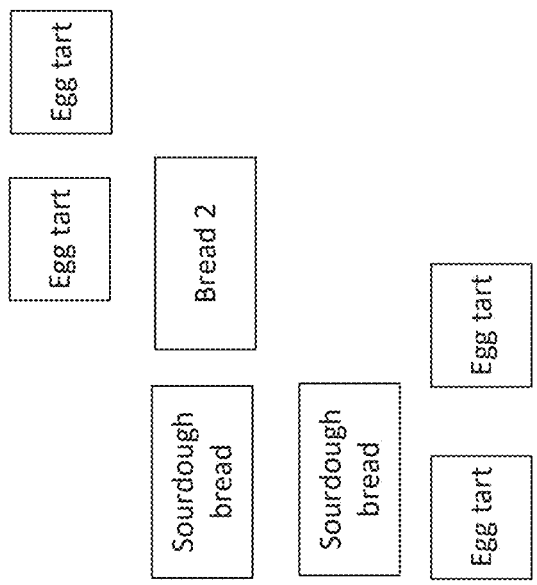
FIG. 3C illustrates exemplary machine learning models in an AI-assisted vision system in accordance with some embodiments.
Figure 3C:
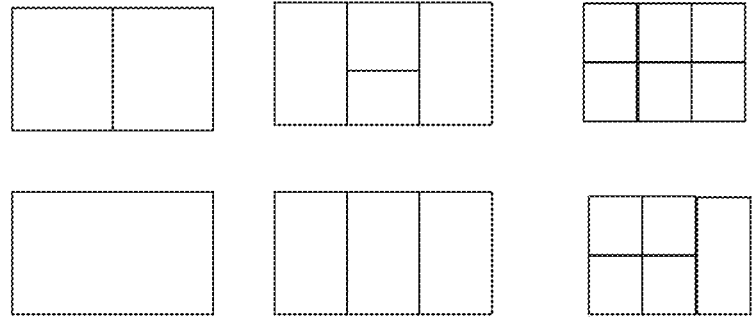
Figure 3C:
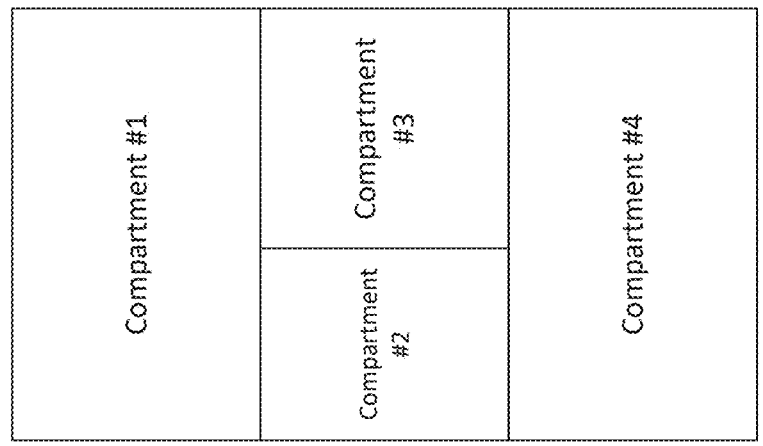

FIG. 3C illustrates exemplary machine learning models in an AI-assisted vision system in accordance with some embodiments. The machine learning models may be stored in a memory of the AI-assisted vision system and triggered by a processor. In some embodiments, two models may be trained and deployed: a pan layout recognition model 334 and a dish recognition model 335.

In some embodiments, the food pan layout recognition model 334 may include a bounding box deep learning model that is trained to draw bounding boxes around the pans. The deep learning model may include an object detector and a regressor. The object detector is responsible for identifying which pixels in an image belong to a pan, and the regressor is responsible for predicting the coordinates of the bounding box around that pan. Both the object detector and the regressor may be trained with labeled training data in an iterative manner (e.g., the parameters of the object detector and the regressor may be gradually adjusted so that the bounding boxes are close to the labeled bounding boxes).

In some embodiments, the dish recognition model 335 may be trained iteratively based on labeled dish images. The dish images may be generated by scanning different types of dishes offered by a foodservice using cameras. The scanning process may include displaying notifications for an operator to change different angles of the dish until a progress indicator showing the scanning is complete. An operator may manually enter the labels for the dish images. Since the number of dishes served by one foodservice is usually small, manually labeling the scanned images may be acceptable. In some embodiments, each label may include an identification of the dish (e.g., name or number). Based on these labeled training data, the controller may train a neural network for food identification based on dish images. For instance, the neural network may include a feature extraction layer to detect the edges, shapes, locations, and colors in a food image, and an output layer with nodes corresponding to the different types of food. Each node may output a matching probability that the food in an input image matches with a food corresponding to the node. During the training process, a dish image may be input into the neural network to obtain the matching probabilities from the nodes in the output layer. Based on a distance between the matching probabilities and the label of the dish image, the parameters of the neural network may be adjusted to minimize the distance. In some embodiments, the distance may be determined as a Euclidean distance. This training process may include multiple iterations until the distance is below a threshold. In some embodiments, the dish recognition model 335 may generate the dish identifications for the foods in each of the bounding boxes.

As an alternative to training a large neural network, the embeddings of the picture characteristics are calculated and used as the "differentiation factor" among other food pictures from the same environment. The embeddings focus on the difference in a smaller sample set from the same food service provider. Picking 1 unique picture out of 20 will be more accurate and effective compared to the case where picking 1 unique picture out of 1 million. This may be referred to as "metric learning."

Figure 3D:
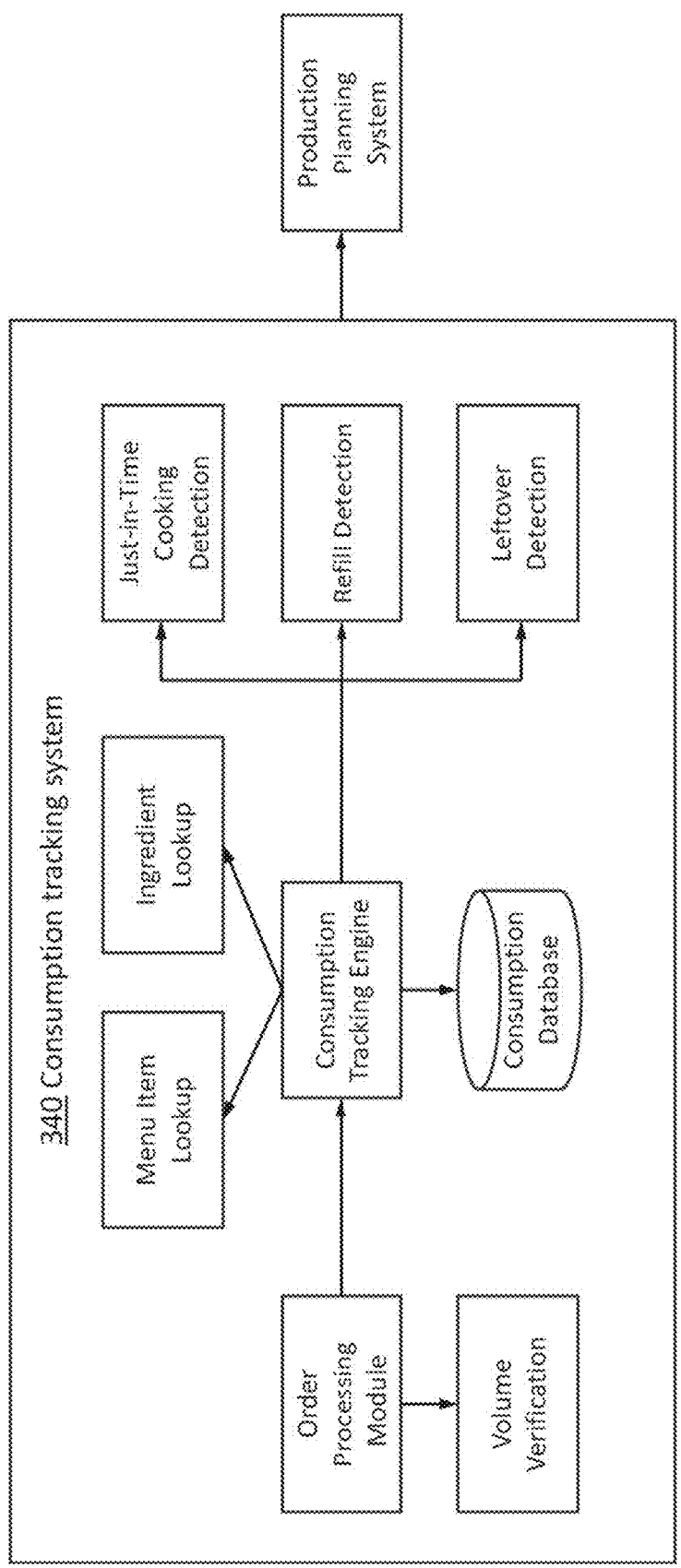
FIG. 3D illustrates an exemplary system diagram for consumption tracking in accordance with some embodiments.

FIG. 3D illustrates an exemplary system diagram for consumption tracking in accordance with some embodiments. The consumption tracking system 340 may include various applications that are built upon a consumption database, which stores the per-pan food volume tracking data. In some embodiments, a consumption tracking engine may retrieve data from the consumption database and generate various consumption tracking pipelines accordingly.

In some embodiments, the consumption tracking engine may use the per-pan volume changes for order processing and volume verification. For example, after a user takes food from the pans, the system automatically charges the price for the volume of food taken by the user based on the volume tracking results. The user does not need to put the food on a scale to do another measurement.

In some embodiments, the consumption tracking engine may display information of the food taken by the user. For example, the names and ingredients of the food taken by the user may be pre-stored in a database system. Once a food is identified, the food identification may be used to retrieve the ingredient information (e.g., names and portions of the ingredients in the food) from the database. Based on the volume tracking data, the consumption rates of the various ingredients may also be tracked.

In some embodiments, the ingredients of a food may be automatically identified based on the 2D image of the food in the container using a trained neural network for identifying food ingredients. Since the number of ingredients being used in a food service is usually limited, the neural network may be trained using labeled ingredient images. The training may include an iterative process in which the parameters of the neurons in the neural network are iteratively updated to minimize the classification errors (e.g., discrepancies between the predicted results and the ground truth labels). The ingredient can be identified across multiple mixed dishes, despite their different cuts, size and shape. The consumption rate of the same ingredient across dishes may be added up to derive the total consumption across a food operation, to help with better production planning.

In some embodiments, the consumption tracking engine may generate alerts to the service provider to perform just-in-time cooking (e.g., cooking new dishes to refill the pans), refilling (e.g., adding more food to pans), or leftover detection (e.g., detecting leftovers in the pans).

In some embodiments, the consumption tracking engine may need to convert volume data into weight information. This may be achieved by using a smart scale with imaging sensors to automatically correlate the weight information of a food with its appearance (e.g., volume). For instance, the smart scale may be used to automatically identify a pan of food, determine the type, volume, and measure the weight, and record it to a database. This data is then used to convert volume to weight when the weight is needed. e.g. For inventory, weight is required instead of volume. The output of the consumption tracking pipelines of the consumption tracking system 340 may be fed into an upper stream production planning system, which is described in more detail in FIG. 3E.

Figure 3E:
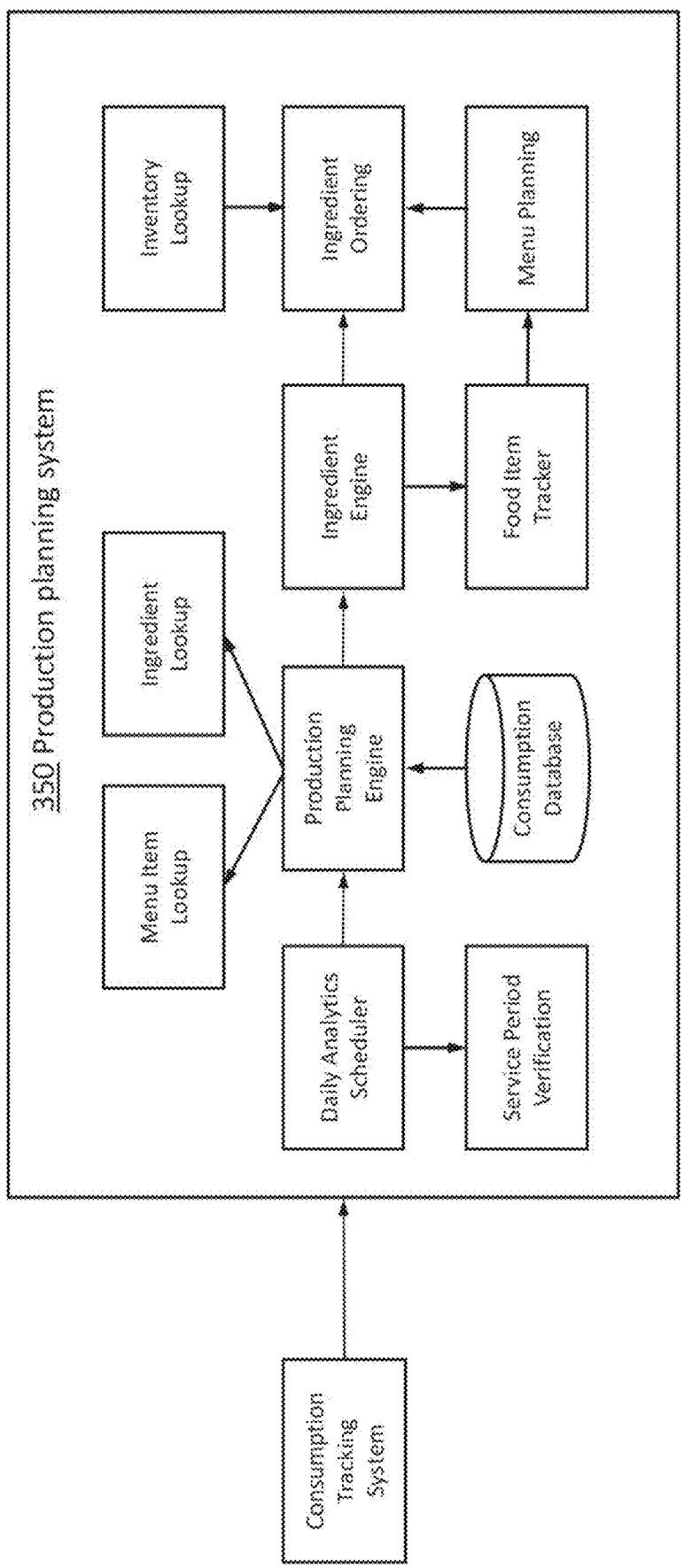
FIG. 3E illustrates an exemplary system diagram for production planning in accordance with some embodiments.

FIG. 3E illustrates an exemplary system diagram for production planning in accordance with some embodiments. The production planning system 350 may share the consumption database with the consumption tracking system in FIG. 3D. A production planning engine may retrieve data from the consumption database and generate various production planning pipelines accordingly.

In some embodiments, the production planning engine may perform daily analytics and service period verification based on the food consumption tracking data. The analytics may be helpful for the service provider to understand the food consumption trends in recent periods, and generate consumer reports for the users.

In some embodiments, the production planning engine may track the ingredients consumptions, and generate inventory lookup requests, ingredient ordering requests, or menu planning. For instance, when a specific ingredient experiences a fast consumption rate and the production planning engine predicts the ingredient will be out of stock within a threshold time, the production planning engine may generate alerts to order more of the ingredient in time.

Figure 4:
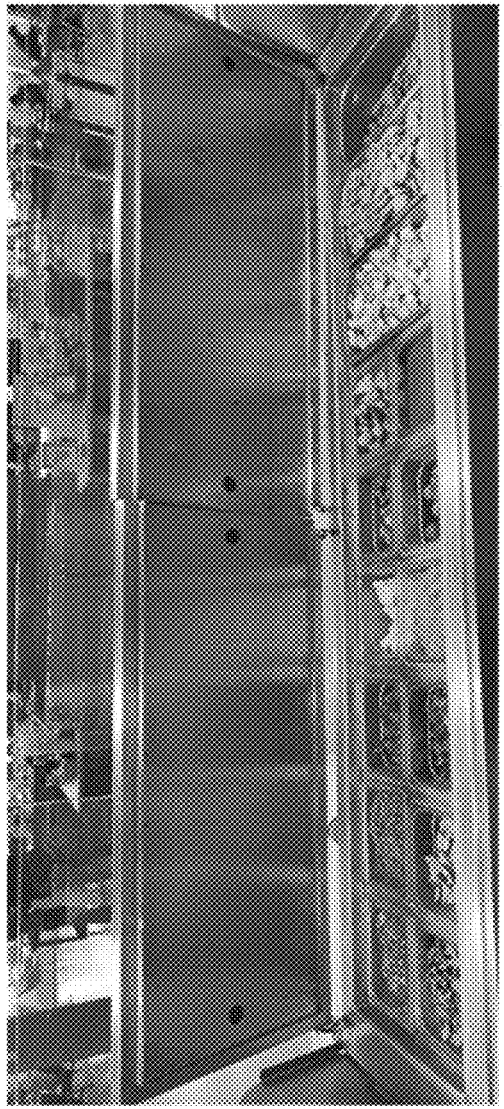
FIG. 4 illustrates an exemplary scenario using an enhanced AI-assisted vision system in accordance with some embodiments.
Figure 4:
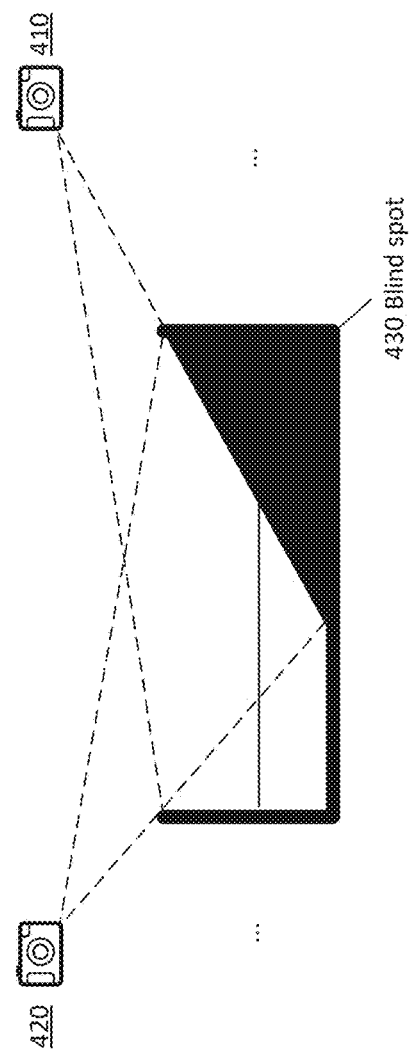

FIG. 4 illustrates an exemplary scenario that requires an enhanced AI-assisted vision system in accordance with some embodiments. When a food station is large enough, such as the long food station 400, one depth camera may not be able to capture sufficient spatial data points to track the food volume in some of the food containers in the food station.

For example, the depth camera 410 may have a blind spot 430 because of the angle of the depth camera 410 and the depth of the food pan. Without the spatial data points from the blind spot 430, the point cloud data for this particular food pan is incomplete and inaccurate. In some embodiments, a secondary depth camera 420 may be installed at an opposite angle as the primary depth camera 410 to provide compensatory spatial data points. For instance, camera 420 is able to capture the spatial data points from the blind spot 430. The spatial data points captured by the primary camera 410 and the second camera 420 may first be angle-compensated based on their respective angles to the food pan, and then aggregated to form the point cloud for the food pan. It is essential to know the exact location of the camera, in order to be able to automatically calculate the angle and coverage area, and image "warping." The exact location is automatically calculated when the camera calibration is done.

Figure 5:
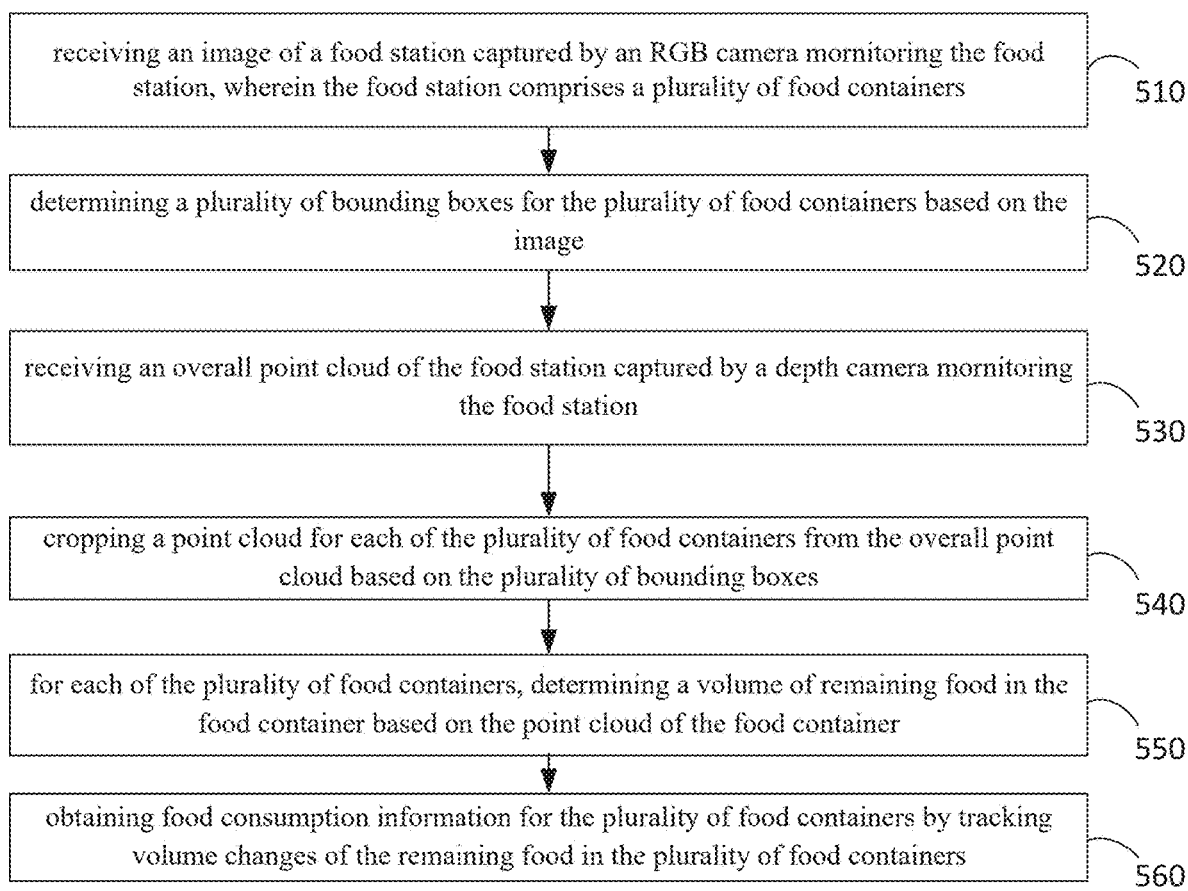
FIG. 5 illustrates an exemplary method for tracking food consumption using the AI-assisted vision system in accordance with some embodiments.

FIG. 5 illustrates an exemplary method 500 for tracking food consumption using the AI-assisted vision system in accordance with some embodiments. Method 500 may be performed by a computer device, apparatus, or system. The method 500 may be performed by one or more modules/components of the environment or system illustrated by FIGS. 1-4. The operations of the method 500 presented below are intended to be illustrative. Depending on the implementation, the method 500 may include additional, fewer, or alternative steps performed in various orders or parallel.

At step 510, the method 500 includes receiving an image of a food station captured by an RGB camera monitoring the food station, wherein the food station comprises a plurality of food containers.

At step 520, the method 500 includes determining a plurality of bounding boxes for the plurality of food containers based on the image.

At step 530, the method 500 includes receiving an overall point cloud of the food station captured by a depth camera monitoring the food station.

At step 540, the method 500 includes cropping a point cloud for each of the plurality of food containers from the overall point cloud based on the plurality of bounding boxes.

At step 550, the method 500 includes for each of the plurality of food containers, determining a volume of remaining food in the food container based on the point cloud of the food container. In some embodiments, the determining the volume of the remaining food in the food container includes: receiving a baseline point cloud of the food container when the food container is empty; computing differences between the baseline point cloud and the point cloud; and determining the volume of the remaining food based on the differences.

At step 560, the method 500 includes obtaining food consumption information for the plurality of food containers by tracking volume changes of the remaining food in the plurality of food containers. In some embodiments, the obtaining food consumption information of the plurality of food containers includes: cropping, for each of the plurality of food containers, a food image from the image captured by the RGB camera based on the plurality of bounding boxes; feeding the cropped food image into a food recognition machine learning model trained to identify a food in the cropped food image; obtaining food information of the food in the cropped food image; and obtaining the food consumption information based on the food information and the tracked volume change of the remaining food in the plurality of food containers. In some embodiments, the obtaining the food consumption information for the plurality of food containers includes: for each of the plurality of food containers, identifying food in the food container by inputting pixels of the image in the corresponding bounding box into a trained neural network to obtain food information; retrieving ingredient information of one or more ingredients of the food in the plurality of food containers based on the food information; and for each of the one or more ingredients, computing a consumption rate of the ingredient based on the ingredient information and the tracked volume changes of the remaining food in the plurality of food containers.

In some embodiments, the method 500 further includes: training the food recognition machine learning model based on training images of dishes served on the food station, wherein the training images are associated with ground truth labels, and the training comprises a plurality of iterations, each iteration comprising: inputting the labeled images of the dishes into a neural network, wherein the neural network comprises a plurality of parameterized layers; obtaining predicted labels of the dishes from the neural network; determining errors between predicted labels and the ground truth labels; and adjusting parameters of the neural network to minimize the errors.

In some embodiments, the method 500 may further include: performing point cloud compensation before determining the volume of the remaining food in the food container, wherein the point cloud compensation comprises: determining a portion of the point cloud for the food container is missing due to vision blockage; extracting a compensatory point cloud from a point cloud captured by a second depth camera; and aggregating the compensatory point cloud and the point cloud to determine the volume of the remaining food in the food container.

Figure 6:
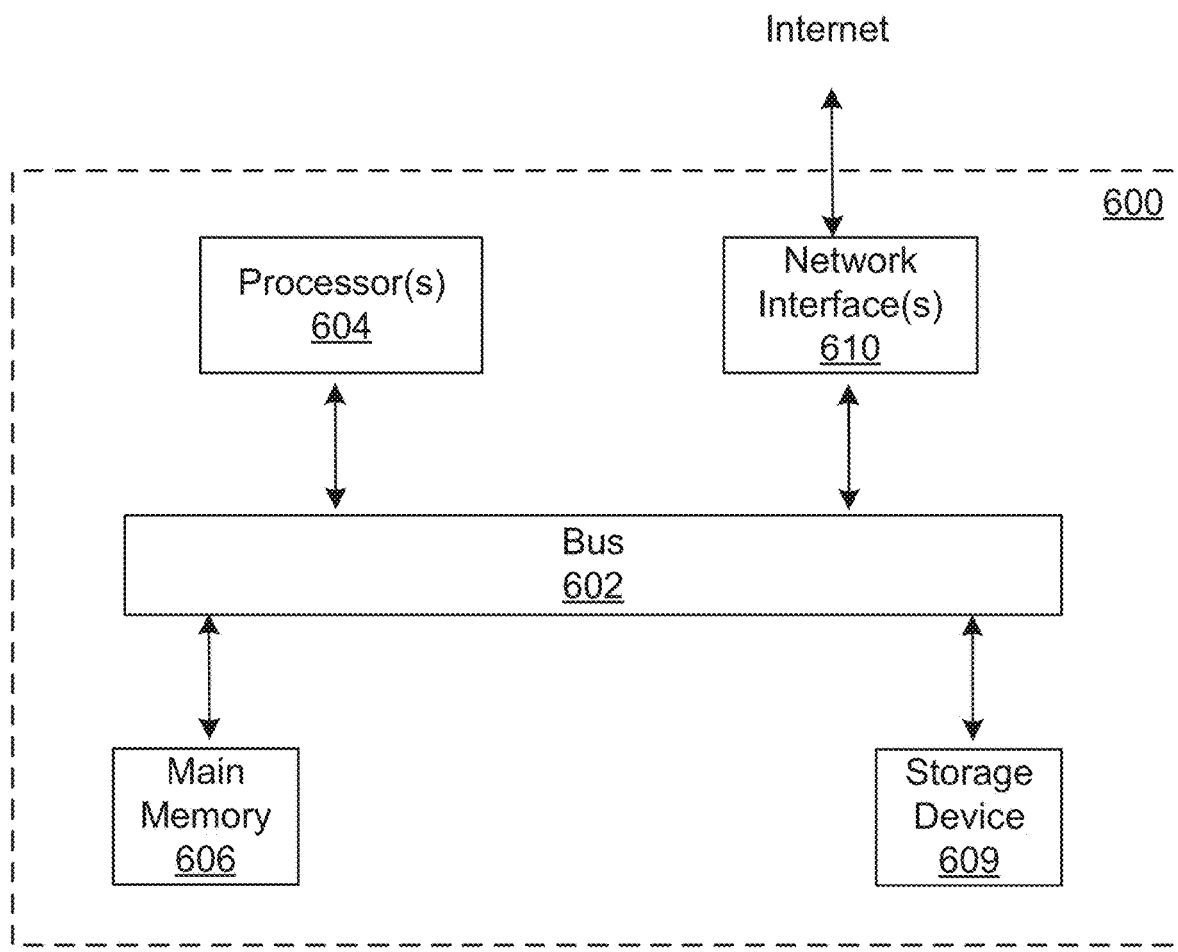
FIG. 6 illustrates an example computing device in which any of the embodiments described herein may be implemented.

FIG. 6 illustrates an example computing device in which any of the embodiments described herein may be implemented. The computing device may be used to implement one or more components of the systems and the methods shown in FIGS. 1-5. The computing device 600 may comprise a bus 602 or other communication mechanisms for communicating information and one or more hardware processors 604 coupled with bus 602 for processing information. Hardware processor(s) 604 may be, for example, one or more general-purpose microprocessors.

The computing device 600 may also include a main memory 606, such as a random-access memory (RAM), cache, and/or other dynamic storage devices, coupled to bus 602 for storing information and instructions to be executed by processor(s) 604. Main memory 606 also may be used for storing temporary variables or other intermediate information during the execution of instructions to be executed by processor(s) 604. Such instructions, when stored in storage media accessible to processor(s) 604, may render computing device 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 600 may implement the techniques described herein using customized hard-wired logic, one or more ASICs or FPGAs, firmware and/or program logic which in combination with the computing device may cause or program computing device 600 to be a special-purpose machine. According to one embodiment, the techniques herein are performed by computing device 600 in response to processor(s) 604 executing one or more sequences of one or more instructions contained in main memory 606. Such instructions may be read into main memory 606 from another storage medium, such as storage device 609. Execution of the sequences of instructions contained in main memory 606 may cause processor(s) 604 to perform the process steps described herein. For example, the processes/methods disclosed herein may be implemented by computer program instructions stored in main memory 606. When these instructions are executed by processor(s) 604, they may perform the steps as shown in corresponding figures and described above. In alternative embodiments, hard-wired circuitry may be used in place of or in combination with software instructions.

The computing device 600 also includes a communication interface 610 coupled to bus 602. Communication interface 610 may provide a two-way data communication coupling to one or more network links that are connected to one or more networks. As another example, communication interface 610 may be a local area network (LAN) card to provide a data communication connection to a compatible LAN (or WAN component to communicate with a WAN). Wireless links may also be implemented.

Certain of the operations may be performed in a distributed manner among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor-executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

Certain of the operations may be performed in a distributed manner among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is in fact disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system for tracking food consumption, comprising:
an RGB camera monitoring a food station, wherein the food station comprises a plurality of food containers;
a depth camera monitoring the food station; and
a processor and one or more memories, wherein the one or more memories store instructions executable by the processor to cause the processor to perform operations comprising:
receiving an image of the food station captured by the RGB camera;
determining a plurality of bounding boxes for the plurality of food containers based on the image;
receiving an overall point cloud of the food station from the depth camera;
cropping a point cloud for each of the plurality of food containers from the overall point cloud based on the plurality of bounding boxes;
for each of the plurality of food containers, determining a volume of remaining food in the food container based on the point cloud of the food container; and
obtaining food consumption information for the plurality of food containers by tracking volume changes of the remaining food in the plurality of food containers.

2. The system of claim 1, wherein the obtaining food consumption information of the plurality of food containers comprises:
cropping, for each of the plurality of food containers, a food image from the image captured by the RGB camera based on the plurality of bounding boxes;
feeding the cropped food image into a food recognition machine learning model trained to identify a food in the cropped food image;
obtaining food information of the food in the cropped food image; and
obtaining the food consumption information based on the food information and the tracked volume change of the remaining food in the plurality of food containers.

3. The system of claim 2, wherein the operations further comprise:
training the food recognition machine learning model based on training images of dishes served on the food station, wherein the training images are associated with ground truth labels, and the training comprises a plurality of iterations, each iteration comprising:
inputting the labeled images of the dishes into a neural network, wherein the neural network comprises a plurality of parameterized layers;
obtaining predicted labels of the dishes from the neural network;
determining errors between predicted labels and the ground truth labels; and
adjusting parameters of the neural network to minimize the errors.

4. The system of claim 1, wherein the determining the volume of the remaining food in the food container comprises:
receiving a baseline point cloud of the food container when the food container is empty;
computing differences between the baseline point cloud and the point cloud; and
determining the volume of the remaining food based on the differences.

5. The system of claim 1, wherein the system further comprises:
a second depth camera monitoring the food station, wherein the depth camera and the second depth camera monitor the food station from different angles.

6. The system of claim 5, wherein the operations further comprise:
performing point cloud compensation before determining the volume of the remaining food in the food container, wherein the point cloud compensation comprises:
determining a portion of the point cloud for the food container is missing due to vision blockage;
extracting a compensatory point cloud from a point cloud captured by the second depth camera; and
aggregating the compensatory point cloud and the point cloud to determine the volume of the remaining food in the food container.

7. The system of claim 1, further comprising:
receiving real-time images from the RGB camera;
determining motions on each of the plurality of bounding boxes based on the real-time images; and
in response to no motion being detected on one bounding box, receiving the overall point cloud from the depth camera.

8. The system of claim 1, wherein the obtaining the food consumption information for the plurality of food containers comprises:
for each of the plurality of food containers, identifying food in the food container by inputting pixels of the image in the corresponding bounding box into a trained neural network to obtain food information;
retrieving ingredient information of ingredients of the food in the plurality of food containers based on the food information; and
computing consumption rates of the ingredients based on the ingredient information and the tracked volume changes of the remaining food in the plurality of food containers.

9. The system of claim 1, wherein the depth camera is a stereo camera, a Sonar camera, or a LiDAR.

10. The system of claim 1, wherein the operations further comprise performing angle compensation before determining the volume of the remaining food in the food container, wherein the angle compensation comprises:
for each of the plurality of food containers, determining a viewing angle for the food container from the depth camera; and
determining the volume of the remaining food in the food container by compensating the view angle of the food container.

11. The system of claim 1, wherein the determining the volume of remaining food in the food container comprises:
determining the volume of remaining food in the food container based on the point cloud of the food container;
obtaining, based on a bounding box for the food container, a 2D image of the food container from the image captured by the RGB camera; and
validating the determined volume of the remaining food in the food container based on the 2D image of the food container, wherein the validating comprises:
determining a discrepancy between the determined volume of the remaining food in the food container and a validating volume determined based on the 2D image; and in response to the discrepancy being greater than a threshold, adopting the validating volume determined based on the 2D image.

12. A computer-implemented method, comprising:
receiving an image of a food station captured by an RGB camera monitoring the food station, wherein the food station comprises a plurality of food containers;
determining a plurality of bounding boxes for the plurality of food containers based on the image;
receiving an overall point cloud of the food station captured by a depth camera monitoring the food station;
cropping a point cloud for each of the plurality of food containers from the overall point cloud based on the plurality of bounding boxes;
for each of the plurality of food containers, determining a volume of remaining food in the food container based on the point cloud of the food container; and
obtaining food consumption information for the plurality of food containers by tracking volume changes of the remaining food in the plurality of food containers.

13. The computer-implemented method of claim 12, wherein the obtaining food consumption information of the plurality of food containers comprises:
cropping, for each of the plurality of food containers, a food image from the image captured by the RGB camera based on the plurality of bounding boxes;
feeding the cropped food image into a food recognition machine learning model trained to identify a food in the cropped food image;
obtaining food information of the food in the cropped food image; and
obtaining the food consumption information based on the food information and the tracked volume change of the remaining food in the plurality of food containers.

14. The computer-implemented method of claim 13, further comprising:
training the food recognition machine learning model based on training images of dishes served on the food station, wherein the training images are associated with ground truth labels, and the training comprises a plurality of iterations, each iteration comprising:
inputting the labeled images of the dishes into a neural network, wherein the neural network comprises a plurality of parameterized layers;
obtaining predicted labels of the dishes from the neural network;
determining errors between predicted labels and the ground truth labels; and
adjusting parameters of the neural network to minimize the errors.

15. The computer-implemented method of claim 12, wherein the determining the volume of the remaining food in the food container comprises:
receiving a baseline point cloud of the food container when the food container is empty;
computing differences between the baseline point cloud and the point cloud; and
determining the volume of the remaining food based on the differences.

16. The computer-implemented method of claim 12, further comprising:
performing point cloud compensation before determining the volume of the remaining food in the food container, wherein the point cloud compensation comprises:
determining a portion of the point cloud for the food container is missing due to vision blockage;
extracting a compensatory point cloud from a point cloud captured by a second depth camera; and
aggregating the compensatory point cloud and the point cloud to determine the volume of the remaining food in the food container.

17. The computer-implemented method of claim 12, wherein the obtaining the food consumption information for the plurality of food containers comprises:
for each of the plurality of food containers, identifying food in the food container by inputting pixels of the image in the corresponding bounding box into a trained neural network to obtain food information;
retrieving ingredient information of one or more ingredients of the food in the plurality of food containers based on the food information; and
for each of the one or more ingredients, computing a consumption rate of the ingredient based on the ingredient information and the tracked volume changes of the remaining food in the plurality of food containers.

18. A non-transitory computer-readable storage medium, configured with instructions executable by one or more processors to cause the one or more processors to perform operations comprising:
receiving an image of a food station captured by an RGB camera monitoring the food station, wherein the food station comprises a plurality of food containers;
determining a plurality of bounding boxes for the plurality of food containers based on the image;
receiving an overall point cloud of the food station captured by a depth camera monitoring the food station;
cropping a point cloud for each of the plurality of food containers from the overall point cloud based on the plurality of bounding boxes;
for each of the plurality of food containers, determining a volume of remaining food in the food container based on the point cloud of the food container; and
obtaining food consumption information for the plurality of food containers by tracking volume changes of the remaining food in the plurality of food containers.

19. The non-transitory computer-readable storage medium of claim 18, wherein the obtaining food consumption information of the plurality of food containers comprises:
cropping, for each of the plurality of food containers, a food image from the image captured by the RGB camera based on the plurality of bounding boxes;
feeding the cropped food image into a food recognition machine learning model trained to identify a food in the cropped food image;
obtaining food information of the food in the cropped food image; and
obtaining the food consumption information based on the food information and the tracked volume change of the remaining food in the plurality of food containers.

20. The non-transitory computer-readable storage medium of claim 19, wherein the operations further comprise:
training the food recognition machine learning model based on training images of dishes served on the food station, wherein the training images are associated with ground truth labels, and the training comprises a plurality of iterations, each iteration comprising:
inputting the labeled images of the dishes into a neural network, wherein the neural network comprises a plurality of parameterized layers;

obtaining predicted labels of the dishes from the neural network;

determining errors between predicted labels and the ground truth labels; and adjusting parameters of the neural network to minimize the errors.

\* \* \* \* \*